United States Patent
Waite et al.

(10) Patent No.: US 7,363,309 B1
(45) Date of Patent: Apr. 22, 2008

(54) METHOD AND SYSTEM FOR PORTABLE AND DESKTOP COMPUTING DEVICES TO ALLOW SEARCHING, IDENTIFICATION AND DISPLAY OF ITEMS IN A COLLECTION

(75) Inventors: Mitchell Waite, 432 Durant Way, Mill Valley, CA (US) 94941; Robert Levy, Virginia Beach, VA (US)

(73) Assignee: Mitchell Waite, Mill Valley, CA (US)

( * ) Notice: Subject to any disclaimer, the term of this patent is extended or adjusted under 35 U.S.C. 154(b) by 587 days.

(21) Appl. No.: 10/726,930

(22) Filed: Dec. 3, 2003

(51) Int. Cl.
*G06F 17/30* (2006.01)
(52) U.S. Cl. ................................... 707/101
(58) Field of Classification Search ............ 707/1, 707/2, 9, 10, 104.1, 101; 709/224
See application file for complete search history.

(56) References Cited

U.S. PATENT DOCUMENTS

| | | | |
|---|---|---|---|
| 6,026,399 A | 2/2000 | Kohavi | |
| 6,222,449 B1 | 4/2001 | Twining | |
| 6,460,049 B1 | 10/2002 | Becker | |
| 2001/0047353 A1 | 11/2001 | Talib | |
| 2002/0021828 A1 | 2/2002 | Papier | |
| 2002/0095260 A1 | 7/2002 | Huyn | |
| 2002/0152200 A1 | 10/2002 | Krichilsky | |
| 2002/0152225 A1* | 10/2002 | Kevan et al. | 707/104.1 |
| 2002/0156770 A1 | 10/2002 | Krichilsky | |
| 2003/0017441 A1 | 1/2003 | Greco | |

\* cited by examiner

*Primary Examiner*—Etienne Leroux
(74) *Attorney, Agent, or Firm*—Thomas M. Freiburger

(57) ABSTRACT

A field guide for identifying objects, particularly natural objects, includes a database of a collection of related objects and provides for step-by-step searching to identify an observed object, eliminating all non-matching objects at each step of the search. One by one, attributes or characteristics are selected, and a value entered under a selected attribute, the value describing the observed object. Once a value is selected, any further attributes which become irrelevant or redundant are eliminated as choices in the continuing search. In addition, once a value is selected, all values under further attributes, which values become irrelevant or redundant as choices, are eliminated from further searching. These features make the search more efficient and ensure against a null result. Values are in a plurality of data types which may include text, number values, color images, sounds, moving pictures and/or silhouettes representative of groups of items. An advanced search mode can be selected if desired, whereby multiple attributes and values are selected in a single step.

33 Claims, 12 Drawing Sheets

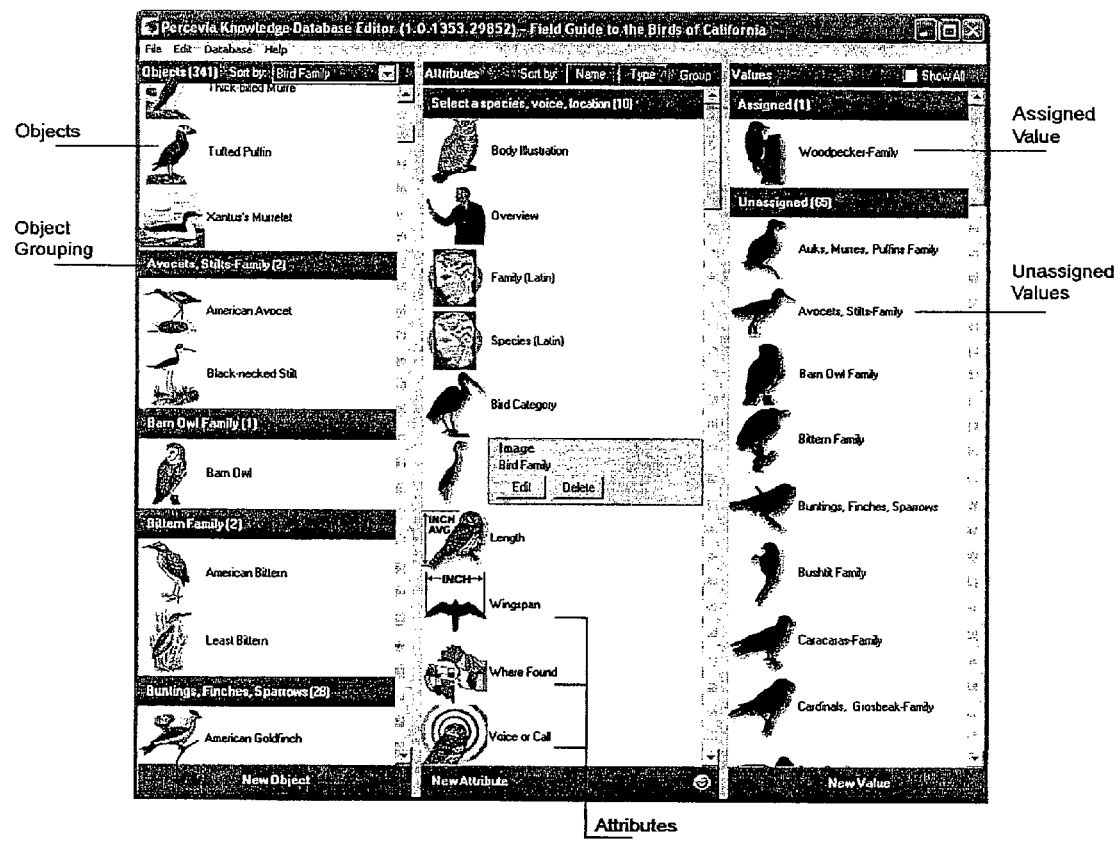
FIG. 2-A

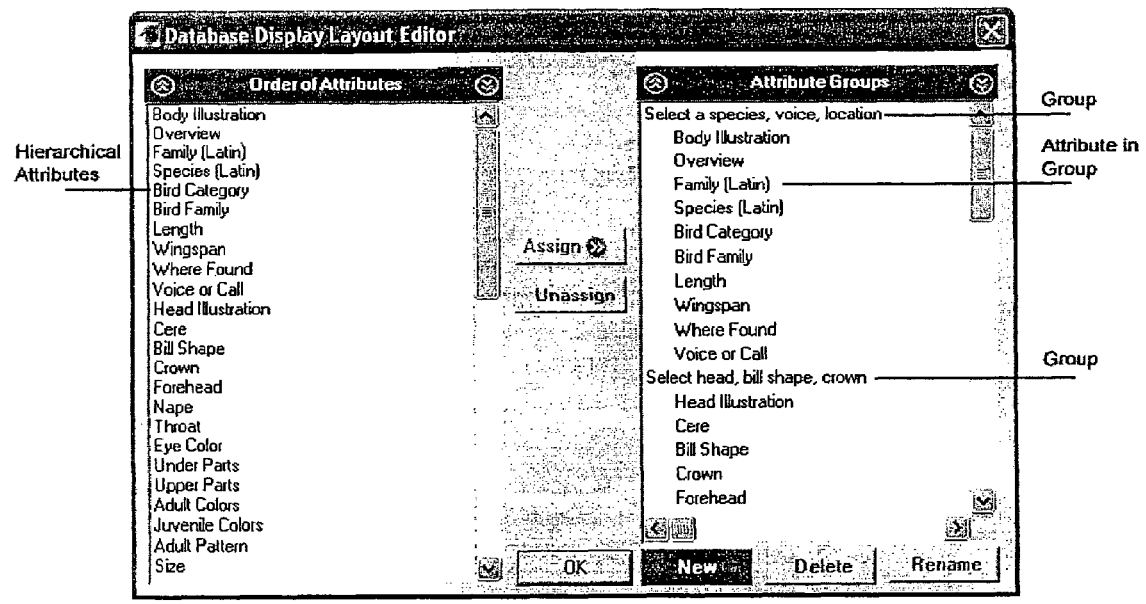
FIG. 3-A

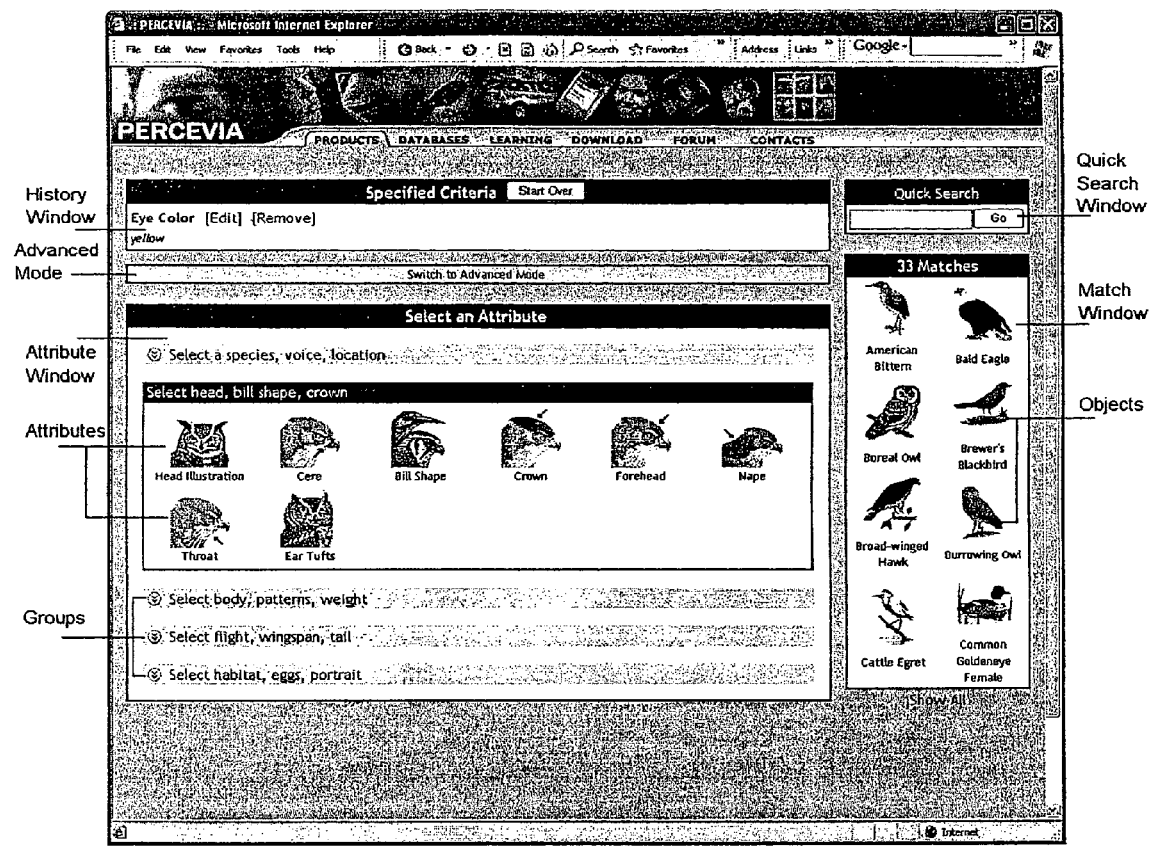
FIG. 4-A

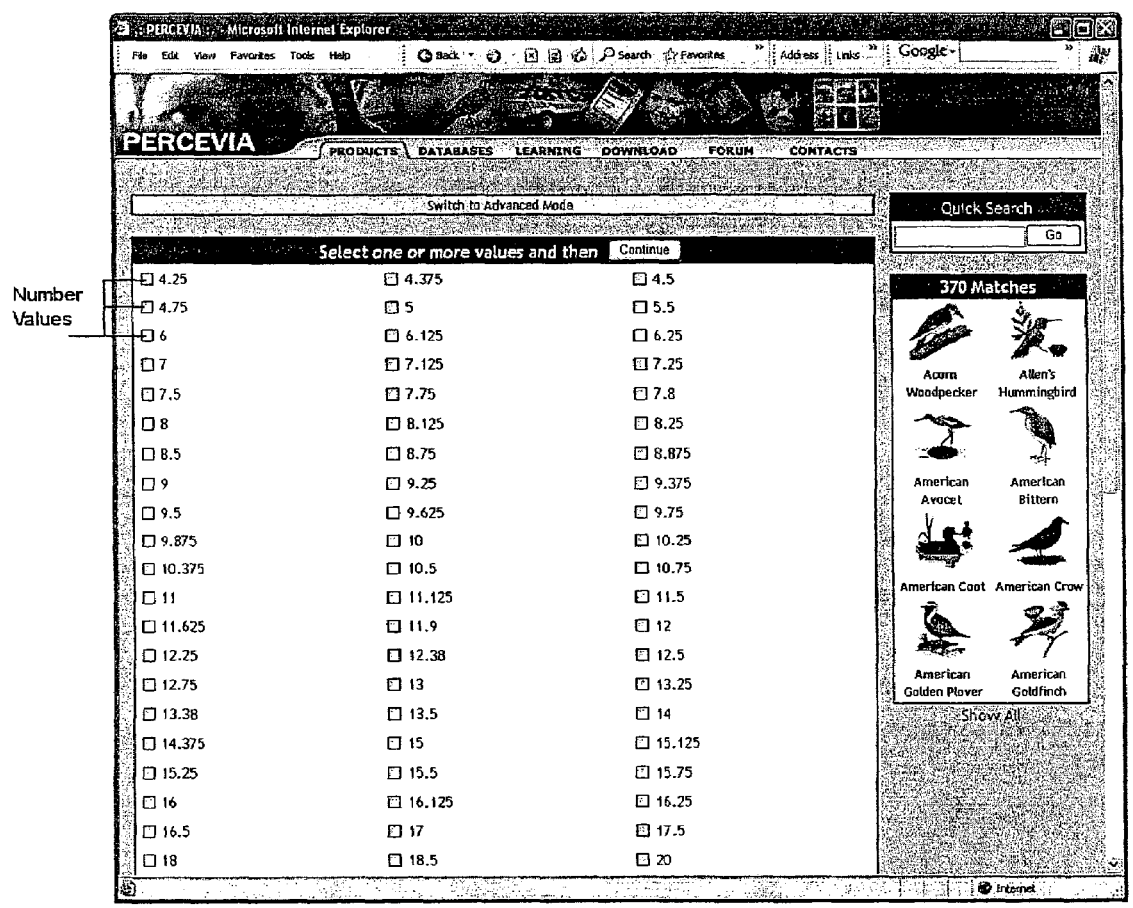
FIG. 4-B

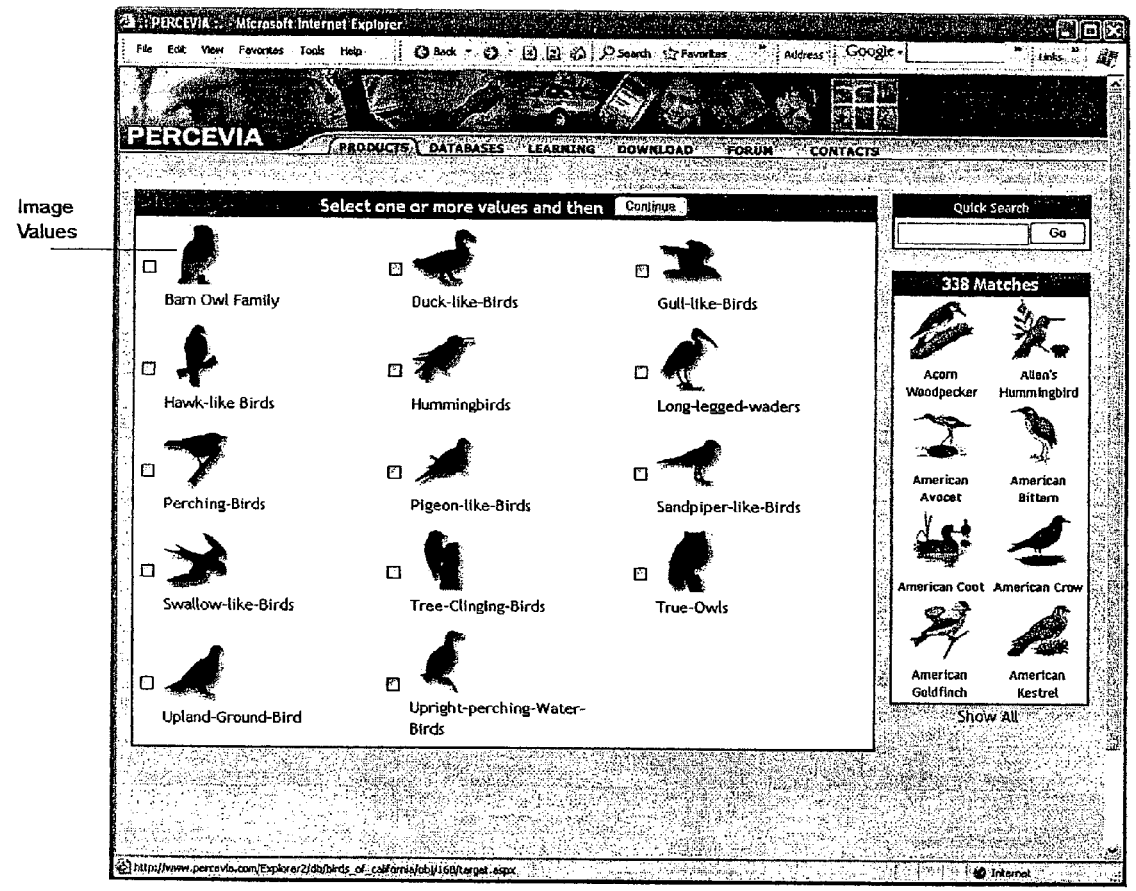
FIG. 4-C

Audio Values

| | | |
|---|---|---|
| ☐ Acorn Woodpecker Voice | ☐ Allen's Hummingbird Voice | ☐ American Goldfinch Voice |
| ☐ American Avocet Voice | ☐ American Bittern Voice | ☐ American Coot Voice |
| ☐ American Crow Voice | ☐ American Kestrel Voice | ☐ American Pipit Voice |
| ☐ American Robin Voice | ☐ American White Pelican Voice | ☐ American Wigeon Voice |
| ☐ Anna's Hummingbird Voice | ☐ Baird's Sparrow Voice | ☐ Bald Eagle Voice |
| ☐ Band-tailed Pigeon Voice | ☐ Bank Swallow Voice | ☐ Barn Owl Voice |
| ☐ Barn Swallow Voice | ☐ Barred Owl Voice | ☐ Belted Kingfisher Voice |
| ☐ Bewick's Wren Voice | ☐ Black Phoebe Voice | ☐ Black Swift Voice |
| ☐ Black Turnstone Voice | ☐ Black-and-white Warbler Voice | ☐ Black-backed Woodpecker Voice |
| ☐ Black-bellied Plover Voice | ☐ Black-billed Magpie Voice | ☐ Blackburnian Warbler Voice |
| ☐ Black-chinned Hummingbird Voice | ☐ Black-chinned Sparrow Voice | ☐ Black-crowned-Night-Heron Voice |
| ☐ Black-headed Grosbeak Voice | ☐ Black-necked Stilt Voice | ☐ Black-throated Blue Warbler Voice |
| ☐ Black-throated Gray Warbler Voice | ☐ Black-throated Green Warbler Voice | ☐ Blue Grosbeak Voice |
| ☐ Blue Grouse Voice | ☐ Blue Jay Voice | ☐ Blue-throated Hummingbird Voice |
| ☐ Boreal Owl Voice | ☐ Brant Voice | ☐ Brant's Cormorant Voice |
| ☐ Brewer's Blackbird Voice | ☐ Brewer's Sparrow Voice | ☐ Broad-billed Hummingbird Voice |
| ☐ Broad-tailed Hummingbird Voice | ☐ Broad-Winged Hawk Voice | ☐ Brown Creeper Voice |

FIG. 4-D

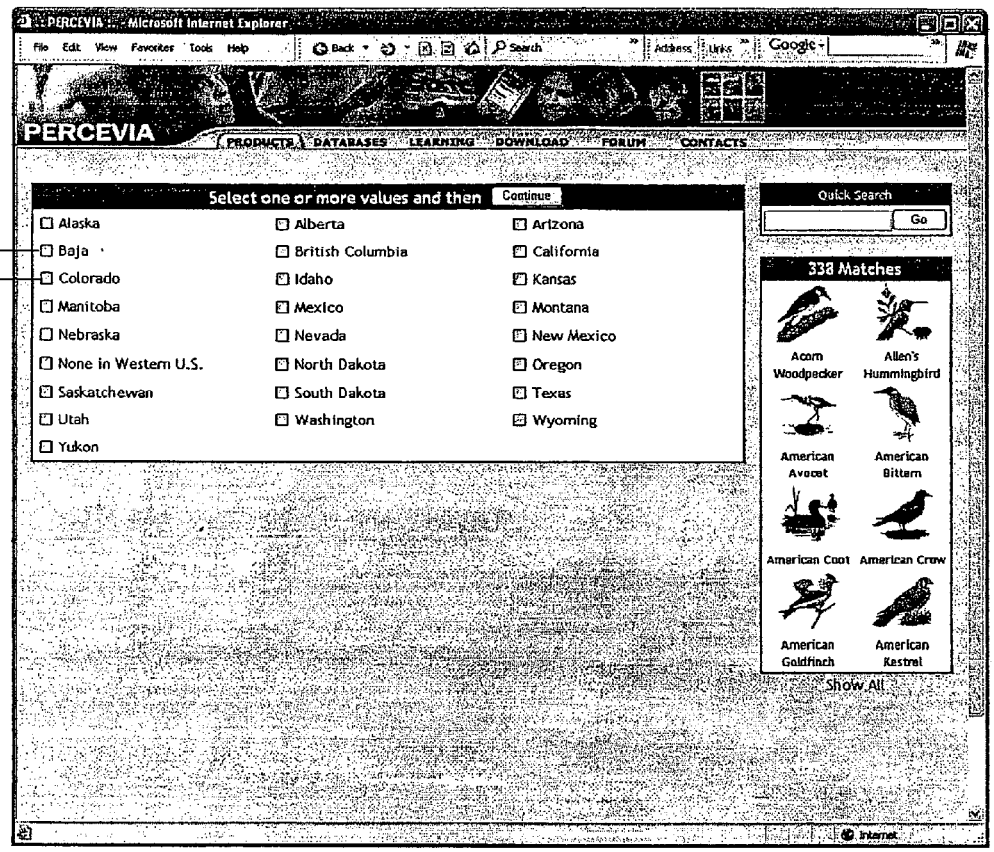
FIG 4-E

METHOD AND SYSTEM FOR PORTABLE AND DESKTOP COMPUTING DEVICES TO ALLOW SEARCHING, IDENTIFICATION AND DISPLAY OF ITEMS IN A COLLECTION

BACKGROUND OF THE INVENTION

This invention concerns "searching programs" executed by computers, and in particular a system for identifying objects by their observed or measured characteristics or selecting objects from a relatively large pool of possibilities by particular desired characteristics. As one specific type of implementation, the invention is applied to an electronic field guide, operating on both portable and desktop computing devices, in which objects existing in nature can be identified by entering their various observed characteristics, thus narrowing the field down to a single possibility. Examples of electronic field guides would include, but are not limited to, guides to birds, insects, shells, trees or flowering plants. The present invention is equally applicable to other collections of objects, including, as examples, coins, stamps, works of art, fingerprints, cars and movie reviews.

In today's modern, technological society, where most work is done in factories, offices or service professions, only a narrow group of academics depend directly for their livelihood upon the observation or accurate identification of natural objects. The general population, however, far from being unconcerned about nature, remains deeply interested in the natural world. For well over a century, the public has used popular printed field guides to assist them in identifying the animals, plants and other natural features they observe.

The history of field guides to birds provides an important example of how printed guides are used, as well as how they have changed and improved through technological advances, particularly via optics, printing and mass communications. The first true field guide to birds, entitled *Birds Through an Opera Glass*, was published in 1889 by Florence Merriam Bailey, who was wife to the famous zoologist, Vernon Bailey, and sister of C. Hart Merriam, who was the first chief of the U.S. Biological Survey. The use of the "opera glass" in the field, as opposed to the more standard approach of killing a bird, then measuring it, reflected a new approach to identifying species that the author wished to promote.

The availability of relatively inexpensive, mass-produced binoculars made it possible for even amateur naturalists to make a reasonable pass at field identification, provided they had clear and accurate descriptions of the local species. Florence Bailey's field guides, which included regional and beginners' bird guides, provided the needed information on bird dimensions, distribution, food and nesting—features that are found in today's field guides as well. However, there were limitations to these early efforts. The birds were presented scientifically in taxonomic order, so the observer needed to have at least a general sense of which family the bird belonged to. Plus, because of printing costs at the time, illustrations in these books were few and in black-and-white.

Over the next several decades, the burgeoning conservation movement helped propel a growth in popular interest in bird-watching. During the 1930's, one of America's foremost ornithologists, Professor Ludlow Griscom, who was Research Curator of Harvard University's Museum of Comparative Zoology, demonstrated that it was possible to make scientifically reliable field identification of birds with observation, using binoculars, and not just using measurements on collected specimens. Encouraged by Griscom, his student, artist and bird watcher Roger Tory Peterson, assembled and published in 1934 the first truly modern field guide to birds, entitled *A Field Guide to the Birds*. What is now called the "Peterson System" and what made it different from other field guides of the day, is that it organized species information not on the basis of taxonomy or scientific classification, but on the basis of visual characteristics observable in the field. Peterson grouped visually similar species together on a single page, and used hand-drawn arrows to draw the reader's attention to the key field marks that distinguished one species from another. His great skill as an illustrator made these marks evident even to the birding novice and recent advances in color printing technology ensured that Peterson's groundbreaking field guide was widely affordable.

Peterson's identification method, moreover, proved so useful with birds that it soon found application in other areas of the natural world, and the Houghton Mifflin Field Guide series alone now has over 40 titles. The method has also been useful in identifying man-made objects; while Peterson was in the U.S. Army Corps of Engineers during World War II, he was requested to apply his field mark technique to a plane-spotting manual.

Field guides published today still provide the same basic elements as those produced decades back: an identification system based on field marks; skillful color illustrations to assist in distinguishing similar species; and extensive information about the morphology and ecology of the species. The usability of these books has, in recent years, been considerably enhanced by such features as thumb-indexing, color-coded edge tabs, or weather-protected covers and paper, laminated supplements, more durable bindings and other physical enhancements.

The printed field guide, even with the improvements possible with modern printing and publishing methods, still suffers from some inherent limitations. First, a print field guide is necessarily incomplete. No book-based guide could possibly contain information on all bird species and subspecies and remain either portable or affordable. Guides therefore make selections. They focus on broad geographic regions (such as the *Field Guide to the Birds of California*), and include as many species as possible. But regions in transitional areas may need two or even three regional field guides for reasonable coverage. Further, natural variation so great that it is impractical to show all the seasonal and regional variants for each species.

Secondly, print guides are static. Over the lifespan of an edition of a field guide, scientific knowledge about species increases, ranges and migration patterns change, variants and sometimes even species are reclassified, the conservation status of a species may improve or decline. Publishers may make corrections and changes in subsequent printings of a book, but all the units already in circulation can't be updated, and will preserve the old information.

Third, print guides are limited organizationally, because they can only arrange all their information into a sequential series of pages in one or two ways. Commonly the field guide book has two principal sections: an introduction to the major groups with an overview of the major identification characteristics, or field marks; and a second section, comprising most of the book, which contains the individual species illustrations and descriptions. These descriptions may be organized by taxonomy or by some key morphological characteristic or by habitat. Whatever the organization, extensive indexing and cross-referencing is necessary, so field identification using printed guides almost always requires slow, manual page-turning and section jumping. This means a bird, for example, may disappear before the desired page is found.

Fourth, print-based field guides are limited to only two media types—image and text. Bird calls constitute a critical identification feature, and although many print-based systems to represent calls have been utilized, such as onomatopoetic transcription and even sonograms, there is no substitute for an actual, recorded sound to assist in identification. Similarly, bird movements, especially flight patterns and movements, are also important distinguishing field features, and a static print image can, at best, only suggest what a bird in flight would look like. And fifth, anyone reading a printed book has no way of knowing about others who are reading the same book, and thus sharing information among readers is limited to people physically getting together, which is not always practical.

Electronic field guides could not only present, in a page-like format, all the information contained in conventional, printed field guides, but they could, potentially, also overcome the limitations of print. Being electronic, rather than physical, they could be expanded and updated periodically, even instantaneously; they could sort and present information in a variety of ways; and they might also include sounds and animated images along with text and standard illustrations. They could be linked to web sites over the internet for expanding the information available; and they could also be linked into peer-to-peer networks, allowing the sharing and updating of observed data, in the same way that many people currently share their favorite music tracks over the internet.

The ever-larger numbers of people seeking out-of-doors recreation, combined with the public's increasing comfort with computers and other portable electronics, suggests that there would be a substantial market for electronic nature-guide products that enhance the printed field guide with improved search and media capabilities. Preferably, such products would replicate the tried-and-tested use patterns of printed field guides. They would employ efficient search and selection procedures based on readily observable characteristics, like the field marks found in modern field guides to identify birds. In addition, they would ideally run on a variety of technology platforms, which would allow them to serve the printed guide's multiple functions of field identification, general reference and education about the natural world.

Such electronic nature guide products could also serve as identification or selection guides to collections of other kinds of items, such as stamps, coins, automobiles, works of art or even movie reviews.

The U.S. Fish and Wildlife Service estimates that 42 to 50 million Americans over 16 years of age watch birds, representing an enormous possible market for innovations in field guides. Publishers and software developers have responded to the public interest in electronic nature guides by creating a wide range of products that run on several technology platforms, and with features and functions that meet a broad range of consumer and professional needs. These products fall into five main categories: 1) internet-based reference sites to the natural world; 2) CD-ROM- and DVD-based nature guides; 3) database or search programs for personal computers that contain species information; 4) specialized (dedicated) portable electronic devices to assist field identification and data collection; and 5) field identification software systems that can run on mobile computing devices such as personal digital assistants (PDAs), Palm devices, Pocket PCs and SmartPhones.

In addition to these electronic nature guides, there are also numerous internet- and computer-based systems that may not be specifically implemented as nature guides, but that provide search, selection and display functions of items within a collection. Such systems could serve as software engines for electronic nature guides if they were populated with natural history content, although not with the functions and efficiency of the present invention.

Many internet sites provide the type of information contained in printed field guides, and one of the most comprehensive of these sites is enature www.enature.com. This site presents 13 field guides from the Audubon series, including amphibians, birds, butterflies, fishes, insects, mammals, reptiles, seashells, seashore creatures, spiders, trees, wildflowers and native plants. To find information on a particular species, the internet visitor employs a simple, two-tier selection system. First, the user selects from a listing of 14 general types of birds (such as long-legged waders, upright-perching water birds, duck-like birds, etc.). This produces a listing of individual species, with thumbnail photo images. If the list is longer than 15 items, it is spread over several connected pages. Selecting one of the species on the list produces a larger photo, along with species information, range maps and a sound clip of the bird's call. The site also offers an Advanced Search mode, which allows the user to select species on the basis of type, plus up to four other attributes simultaneously: color, size, habitats and region. While the enature.com site serves well as a comprehensive natural-history reference source, and derives from a respected series of field guides, it is not designed or intended to help with field identification. First, it lacks a multi-level search engine, and does not support searching through the list of species and selecting on the basis of field markers such as eye color, wing span, bill type, crown pattern, etc. Second, using the Advanced Search method may result in zero matches, because it is possible to select combinations of attributes that no bird in the database possesses. Further, the system requires a constant live internet connection, which may be impractical in a field setting.

Another relevant internet site is the Biodiversity Institute's "Internet Field Guide to Birds," (http.//www.bdi.org) which allows the user to identify birds on the basis of particular characteristics. The system supports searches on more than 40 attributes, including the bird's geographic area, common or scientific name, body characters, wing characters, head characters, tail characters and leg/foot characters. Knowing only a few of the bird's attributes is still enough to narrow down the list of possibilities to a reasonable size. Extensive information, plus one or more photos, are available for each species. In addition, the site can produce a checklist of all bird species in a designated area, and supplies information for all species within a selected group, such as all the Owls. Most of the detailed information on a particular species is supplied through an affiliated site, the NatureServe Explorer. Like the enature.com site, the Internet Field Guide to Birds provides an excellent reference service, though it is clearly targeted at a more advanced audience that already knows something about birds and field identification. Its principal limitation is that it is an "all at once" type of search engine, e.g., it requires entering all the search criteria into an Advanced Search page. Once the search button has been clicked, the user can only refine the search by starting over. Secondly, it requires an internet connection and standard internet browser software, so it can not readily be brought into the field. Thirdly, the search may result in no matched birds if the wrong combination of characeristics is entered.

Other internet sites, discussed below, offer search, select and display functions similar to those required for an electronic nature guide, but whose content consists of objects drawn from many interest areas, including electronic products, automobiles and potential male/female relationship matches. A second important format for electronic nature guides is embodied as a multimedia CD-ROM or DVD disc that runs on standard personal computers. Publishers of print field guides often produce multimedia versions in collaboration with other organizations that supply additional content or else production or distribution services. One of the premier multimedia sets is *The Guide to Birds of North America, V3*, which was produced jointly by Thayer Birding Software (one of the leading bird field guide publishers) and the Cornell Laboratory of Ornithology. This multi-disc set includes the complete collection of 930 birds seen in the U.S. and Canada, and contains thousands of color photos, songs for hundreds of species, and many video clips. The software is also designed to help in bird identification. The user selects the color, size, habitat or location of a bird, and the software presents a list of possible matches. Other similar CD-ROM versions of popular field guides are available for the Peterson Field Guides (*Peterson Multimedia Guide to North American Birds*) and for the Audubon Guides (*National Audubon Society's Interactive CD-ROM Guide to North American Birds*). Generally, these CD-ROM sets are straightforward conversions of the print-based guides, enhanced with sound, video clips, additional reference material and some interactive components such as games and quizzes. However, the species identification process with the CD version is essentially the same as using the print guide because the advanced search capabilities of the computer have not been utilized. Even though these multimedia CD or DVD packages could, in theory, be brought into the field on notebook computers equipped with optical drive bays, the software is not specifically designed to support rapid field identification. Their intention, rather, is to serve as reference and as an education platform that assists the field birdwatcher only indirectly.

A third major product category of electronic nature guides consists of software that is not simply a multimedia version of a print field guide, but a specially designed database program that allows a personal computer user to search, organize and display species-related information in a variety of ways. An example of this type of product is YardBirds, one of several products from Ramphastos (http://www.ramphastos.com/) that are distributed on CD-ROM. The product allows the identification of birds by over 100 combinations of attributes, such as head color, size and feeding style. The system begins by presenting a picture of a common sparrow, which is actually an image map—that is, an interactive graphic capable of presenting the user with different bits of information, depending upon where the computer cursor is positioned. With YardBirds, the user rolls a mouse pointer over different areas of the illustration, and when the pointer is above a searchable "field mark," an identifying text label appears on screen. In the "Novice" mode, the labels are limited to the larger body parts; for example, while you can click on the head, you can't click on the eye. In the "Experienced" mode the labels become more granular and you can pick smaller marks, such as the eye. An alternative way to select "marks" in YardBirds is via drop-down menus and scrolling windows.

YardBirds uses a step-wise, narrowing approach to searching. For example, prior to searching, the system notes in a window that there are "478 birds to chose from." If the user selects a field mark, such as eye color, and then selects "white" as a value, the program searches for only those birds with white eyes. The display then indicates "2 birds to choose from." The user can now choose a second field mark, and the program will further narrow the search. However, because all the field marks are presented at once in the drop-down menu, it is possible to select a mark that has no effect on the search results. Irrelevant or redundant attributes are not automatically eliminated in this system, and the user has no way of knowing that the field mark is useless unless the search is actually performed. YardBirds does, however, eliminate redundant or irrelevant values for particular "field marks" or attributes. For example, if the user chooses a bill color of black, the program will present eight possible bill shapes; if a bill color of blue is chosen, there will only be two possible bill shapes displayed.

YardBirds does not present images of the birds that remain as possible matches; instead, the user must click a button labeled "See Bird" or click on a drop-down menu to see the birds' names. Once the "See Bird" button has been activated, the user is unable to go back and refine the search.

In addition to interface limitations that make field use difficult, the YardBirds program requires a standard personal computer to run, and is not designed for mobile computing devices smaller than a conventional notebook computer. This makes the program unsuitable as a replacement for a print field guide. Moreover, YardBirds is not available as a remote service over the internet, so a user's access is restricted to the computing systems on which the software has already been installed. In addition, the YardBirds database is static; the user can't edit or add to the information supplied by the manufacturer, other than a simple journal facility to append notes.

Another PC-based, interactive identification program is IntKey, which is used principally by professional biologists and taxonomists. It was developed by Australia's Commonwealth Scientific and Industrial Research Organization (CSIRO). The program is used to identify the taxon to which a specimen belongs. Identification is by a process of elimination using an interactive system of "keys," which are hierarchically organized sets of characteristics commonly used by biologists to identify species. (The program's name is a shortened version of "Interactive Keys.") Initially, IntKey presents is a list of characteristics that can be used to identify the specimen, and a list of all the possible specimens. When a characteristic is selected, a window with the possible values is presented and the user selects the value that describes this characteristic of the specimen the user is looking for. Once selected, IntKey filters out all the candidate specimens that do not fit the description of this characteristic; the user is presented with one window with a list of all the candidate specimens remaining and a count, and another window with a list of all the candidate specimens that have been excluded and a count. The process is repeated until the candidate list is narrowed down to the one the user is looking for.

A limitation to this program, from the perspective of the amateur field identifier, is that there is nothing to stop the user from selecting a characteristic that is not valid for any of the remaining candidates, so that all the candidates will be excluded. Also, there could be a characteristic offered where the same value applies to all the remaining candidates, so that by selecting it, the user would not reduce the candidate list at all. In addition, because the software runs only on PCs, it is not easily portable into the field environment.

Another non-PC interactive identification program is NaviKey, an internet-based application that was developed at Harvard University (but is no longer available or supported). NaviKey begins by offering the user a list of characteristics and a list of candidates. The user selects a characteristic and is then given a list of possible values. The user selects the appropriate value. All the candidates that do not meet this criterion are removed, and the list of candidates is reduced. So far, NaviKey appears similar in operation to IntKey; where it differs is that once the candidate list has been reduced, any characteristics that no longer apply to the candidates remaining on the list are eliminated from the characteristics list. Thus, when the user wishes to select the next characteristic, the irrelevant characteristics are gone; the only characteristics remaining on the list are those that are applicable to the remaining candidates, and thus are useful in further reducing the candidate list. This iterative approach will never end in a null result (no candidates remaining), and every new criterion added to the step-by-step selection process will always help to reduce the remaining candidate list. Like IntKey, NaviKey is aimed more at the biology professional than at the amateur naturalist. Because it is an exclusively web-based system, it is intended for desktop operation, and can not serve as a remote, field-based identification system.

A fourth product category of electronic nature guides includes dedicated portable electronic devices that are specially designed to assist the work of both amateur and professional field observers in identification and data collection. The Identiflyer, for example, is a single-purpose, portable electronic device that helps identify birds from their songs. The hand-held unit accepts interchangeable song cards, each containing ten bird songs, and presenting color images and information about those species. Bird songs, however, represent only one of many attributes needed for proper field identification, so this unit could never replace a true field guide.

A fifth product category of electronic nature guides includes field identification software systems that can run on mobile computing devices such as personal digital assistants, Pocket PCs and SmartPhones. For example, U.S. Patent Publication 2002/0152225, "Method and System for Provisioning Electronic Field Guides" outlines a procedure for downloading selected multimedia content from a stationary, desktop personal computer to a portable, hand-held computer, such as a Palm device. The multimedia content consists, in this instance, of bird songs and pictures. The value of the claim is that the fixed computer is more powerful than the handheld unit, and it is capable of storing vastly more data. The user would interact with the fixed computer and select which multimedia data gets downloaded into the hand-held unit. Just those sounds and images pertaining to a certain geographical region could be sent to the portable device, thereby saving it much processing work. Once this data has been downloaded to the portable device, the user can click on names of regions and hear or see the birds in that region. The patent notes that the connection for these downloads from the stationary computer to the portable computer may not just be hard-wired but may be via any communications network, including telephones or wireless networks. A limitation of this system as an aid in field identification is that there is no facility for searching or selecting individual species on the basis of observed attributes.

Software systems that are currently used to search, select and display items from collections may be used with of many different kinds of objects, not just those that are the subject of nature study. For example, Match.com (www-.match.com), one of the more popular dating-service web sites, is a search engine specially designed for singles seeking singles. The site allows members to enter specific information about their likes and dislikes, health, education and other personal information. The web site also provides a detailed search engine for helping the user find others possessing the criteria they are interested in. In this mode the searcher is required to fill out a form containing about 20 questions. The answers are used by the system to help narrow choices among the membership. Questions include, for example: "Show me profiles within 5, 10, 25, etc. miles of my zip code"; "Select one of 14 hair color choices"; and "Select from eight body types." These are equivalent to attributes in a nature guide. Entering all the information takes about ten minutes. Once the user has filled out the form and clicks the GO button, the Match.com system returns photos of all the people that meet the user's criteria, with links to the forms that they filled out so the searcher can learn more about them.

There are important similarities between the Match.com system (and the many internet systems like it) and the way that the user of a field guide selects from a large population of candidates on the basis of specific characteristics or attributes. The limitation of this system, from the electronic field guide perspective, appears when the searcher wishes to refine the selections. Match.com works like most internet-based search engines; it presents the user with a large and fixed set of choices each time a search is performed. For example, if the user starts out asking for all females with blue eyes and blond hair who are within 10 miles of a zip code, Match.com will present all matches in the database that have those criteria. The user will get back every female in this area of every age, education, health, body type and so on, with blond hair and blue eyes. Now if the user wishes to select from this group just those women with a slender body type, he will have to go back and perform the entire search over. Step-by-step reduction of the field is not possible.

A further limitation of this "all at once" type of search and selection system becomes apparent if there are NO women with a slim body type who also match the other criteria that were previously entered. Because the information form Match.com presented to the user always includes slender body type as a possible selection, the user has no way of knowing that it is a waste of time to select that criterion, given his other preferences. There may be many other "irrelevant" criteria that are no longer found in the user's search, but since the search form remains static, this will not be apparent. For example, the user who selected women with blond hair, blue eyes and within 10 miles of his zip code may go back and remove slim body type as a criterion and replace it with "age between 35 and 40 years old." If there are no women with those criteria, then the system again returns zero matches. This "no matches found" result can be a particularly frustrating experience. It is, however, a functional characteristic of many internet- and PC-based search programs.

Another internet web site with search and select capabilities is CNET, which provides extensive reviews and technical data for consumer electronics goods. The basic premise of the site is to allow selecting a few preferred products from a large collection of similar products on the basis of key personal preferences, specifications and features. For example, users interested in notebook computers would select that area of the site from the CNET home page, and would be presented with an initial notebook selection page. Here, the user may make an initial selection on the basis of just two significant attributes: "price range" and "manufacturer." (The number of attributes appearing on the initial selection page will vary with product category.)

Once the initial attribute selection has been made, the system displays the number of matches found in the entire collection of notebook computers, and the first 10 products on the match list. Further attribute selections are made by using filters that appear as drop-down boxes that display a range of values. The number of filters on this page will vary by product category; for notebook computers, there may be nine filters: Price, Manufacturer, Processor, Clock Speed, RAM, Hard Drive, Weight, Screen Diagonal, and OS provided. Filters may be selected either one at a time, narrowing the number of matches down in a step fashion, or several filters may be selected simultaneously.

However, as in the case of the Match.com site, it is possible to obtain zero matches using the CNET system because once the user has passed the initial selection page, all attribute filters are always available, even ones that are irrelevant, and no values are eliminated. In addition, if multiple filters are used simultaneously, it is not possible to tell which combination of attribute values needs to be changed for valid matches to be produced. The system does, however, allow the application of one attribute filter at a time, and even though this does not eliminate the possibility of zero matches, it makes evident which attribute filter should be re-set in order to prevent an invalid search result.

Another approach to searching through object collections by ranking attributes is represented by U.S. Pat. No. 6,026,399, "System and Method for Selection of Important Attributes." This describes a specialized data mining instrument for determining which attributes in a database are important for a particular search. First, the user chooses one attribute for analysis. The system then evaluates the relationship of this attribute to all the other attributes, and ranks each attribute in terms of how strongly it "correlates" with the first attribute. In an example of a collection of cars, if the first attribute chosen for analysis is "country of origin," then the attribute "year" doesn't correlate strongly, because each country continues to produce cars each year. However, the attribute "brand" is strongly correlated with "country of origin," because most car brands (like Volvo) originate in only one country. This system assigns a numerical value to these attribute correlations, and then creates a graphic representation for quick visual comparison.

This correlation patent differs from the search and selection process of an electronic nature guide because its function is not to identify a particular entity from a data set, but to provide a best-guess, recommended search path based on probability distribution. It does not include a method or process for grouping attributes, except as they are associated with another attribute. It does not include a method or system for displaying information about the item in the collection that is eventually identified. From a search or data-mining perspective, this invention is principally a procedure for organizing intermediate results, rather than a complete system for categorizing, searching, selecting, and displaying, as is necessary for a field guide embodiment.

A further approach to searching object collections by keyword searching within a taxonomy is presented in U.S. Patent Publication 2001/0047353, "Methods and Systems for Enabling Efficient Search and Retrieval of Records from a Collection of Biological Data." This invention describes an internet-based search tool that allows navigation through a collection of bioinformatics data. The system performs a series of keyword searches with categorized search results, indicating the number of records in the bioinformatics data collection that remain within the parameters of a search. This allows users to disregard irrelevant information.

The search depends on having items that are classified, or categorized according to a hierarchy that divides the collection into large groupings, or taxonomies, with each taxonomy having multiple categories. For example, one taxonomy group would be "biological processes" and it would contain such categories as "cell communication" developmental processes. The user would input a keyword search term, such as "acid." The system searches for the keyword term across one or more of the taxonomies, and displays search results by category, indicating how many records are associated with each. The keyword system, together with the different taxonomies, always provides users with a refined set of listings as results, without irrelevant, null-result searches.

This system differs from an electronic nature guide in that the basic search process is by a textual keyword, rather than by the various data-type values of a particular attribute. It is more suitable to searching through a collection of text objects (such as articles or abstracts of text materials) than searching through a collection of natural objects that are described by text, numerical, or other characteristics. Although it can run on a small-screen wireless device, it is not ideal as a field guide because it requires an internet connection, it uses keywords that are limited to text data types. Most importantly, the Publication 2001/004735 search protocol follows a hierarchical path of the pre-established taxonomy, while field guides use the system of "field markers" to speed identification, together with other attributes, such as region, habitat and behavior. These attributes are not hierarchical, and a search method that is built on a multi-tiered classification system is not well suited to field use.

Another approach to searching object collections by attribute elimination is represented by U.S. Patent Publication 2002/015220, "System and Method for Retrieving Information Pertaining to Product." The system relates to product information retrieval via the internet, with a specific instance of sealant and adhesive products. To establish parameters for the search, the system prompts the user for information (like industry designation) that would reduce the search. The query will specify multiple search criteria that define the desired product's properties. If the product is not available, the system will search for and present alternative products that are related to the unavailable product. A "compare products" feature is also incorporated, which displays the various properties of the selected products.

To make the search more efficient, and avoid the problem of specifying sets of criteria that produce no results, the system responds to the user's initial selection by changing the choices available in subsequent selections. The user's choice of one value in a pull-down menu may change the list of values displayed in subsequent pull-down menus, eliminating values that the first choice has made irrelevant. This feature is claimed to be advantageous because it presents only real options, and avoids the need for the user to evaluate many irrelevant menu items.

The system of the above publication proposes to implement the value elimination process by storing several fixed menu listings for each pull-down selection box, together with the input parameters that would call for each specific menu. All of these menu listings must be specified by the database designer ahead of time. Because the program does not dynamically evaluate the choices at each step, and generate listings based on this step-wise evaluation, this implementation is practical only for a very small number of steps in a selection process, so it is not well suited for use as a field guide. In addition, the system does not eliminate attributes that become irrelevant or redundant as the user proceeds through a search sequence. Further, the selection process is closely coupled with a user registration and order processing system, which makes it more suitable to online commerce applications, rather than reference. Finally, the system entirely web-based, and requires a live internet connection, so it is not well adapted to remote field identification.

The above-described approaches to electronic nature guides, portable field guides and searching and object identification programs exhibit entirely different procedures for searching, selecting and displaying objects as compared to the invention described below. These differences include: the variety of technology platforms on which the invention runs; the types of multi-media data that may be used as a basis for searching and identification; the nature of the search process; the ability to share information among users of the system; the ability to eliminate redundancy at various stages of the search, once initial choices have been made that reduce the number of possible matches among the remaining objects; the ability to avoid zero or null results; and the ability to eliminate non-essential attributes and values.

SUMMARY OF THE INVENTION

The present invention provides a method and system for creating electronic identification guides for objects that are organized into a collection. The invention further comprises a method and system for visually searching and quickly identifying a specific object in a collection of similar objects. The invention differs from prior art in the field of electronic nature guides and computer-based search systems in terms of the algorithm it uses for searching, the technology it employs, the mobility features of the interface, the media types it searches, the ability to share information among users, and the efficiency and approach of its selection and search procedures.

One aspect of the invention is that it consists in part of a database, in which all objects in a collection are described by a number of multi-media based attributes, or characteristics. Each object in the collection is assigned a specific value for each attribute, which value may consist of a number, a range of numbers, a character, a string of characters, an image, an image map, a web link, a sound, an animation, movie, or another media element.

The invention consists of two basic operational components: an Editor for creating the databases to be searched and an Explorer for searching these databases. The Explorer component of the invention provides the user with a flexible software tool that provides several distinct systems for searching and selecting objects from a collection. One of these methods provides progressive elimination of unnecessary or redundant search requirements, or attributes, so that the user achieves a smaller collection of choices on each search. Searches are conducted one attribute at a time. For example, once a user enters "owl" as the general type of bird observed, and assuming for discussion that all owls have yellow eyes, then eye color will be eliminated as an attribute, because eye color cannot further limit the possibilities. This method also provides progressive elimination of unnecessary or redundant values for the above-mentioned attributes, so that the user will never assemble a set of criteria such that no possible matches are found within the collection of objects. These procedures are described herein as Smart Attribute Elimination and Smart Value Elimination.

The invention also presents the user with an alternative search method whereby multiple match criteria may be selected and searched simultaneously, rather than searching for matches sequentially, one attribute at a time. This procedure is described herein as Advanced Search. A unique aspect of the invention is its ability to activate either of these alternative search methods at any point in the search process. For example, the user could start with an Advanced Search on several attributes all at once, such as a range in California, and a cone-shaped bill. With a narrowed candidate list available, the user could then further reduce the number of potential matches with one or more single-attribute searches, such as by specifying all birds with yellow eyes. Another unique aspect of the invention is its ability to search on multiple values simultaneously for a given attribute on a single search, as opposed to most search engines which allow the selection of only one value per attribute. So, for example, the user could specify a crown color for a bird of black and of brown, and the search would return birds possessing both values.

In addition, the invention provides the user with a History Window that shows all the previous stages of a search with multiple steps. This History Window allows the user to return to any previous stage in the search process, and re-set the search criteria from that point on, or delete that attribute, without having to initiate an entirely new search. The subsequent search attributes are not removed, so the rest of the search history remains.

Another unique feature of this invention is that it operates by means of software that is designed to run on a wide range of technology platforms, including server computers connected to the internet, desktop and portable personal computers connected to the internet, desktop and portable personal computers that are not connected to the internet, and because of the use of an iconic finger-tapping interface, mobile computing devices such as Personal Digital Assistants and Pocket PC's. It also runs on new mobile SmartPhones.

A further unique feature of this invention is that it provides a method and system to share information about objects in a collection between portable devices over networks using peer-to-peer technology. It allows the sharing of a single database among users on the peer-to-peer network and it also allows users in the field to share location information.

In one of the preferred embodiments of this invention, the elements in the collection consist of natural objects, such that the invention, running on a mobile computing device, can be used to replace or supplement traditional paper-based field guides, like the popular guides to birds, plants, fish or insects. A unique aspect of the invention is that it replicates the attribute system of "field marks" and the traditional field identification sequence followed by users of conventional, print-based field guides.

In other embodiments, the invention may serve as a guide or reference to collections of many different types of objects, including but not limited to movies, stamps, firearms, songs, student records, books or people in a dating service.

DESCRIPTION OF THE DRAWINGS

FIG. 2A is a screen shot depicting the appearance of the Database Editor in the preferred embodiment of an electronic field guide to birds.

FIG. 3A is a screen shot depicting the appearance of the Layout Editor in the preferred embodiment of an electronic field guide to birds.

FIGS. 4A through 4E are screen shots depicting the appearance of the Explorer in the preferred embodiment of an electronic field guide to birds.

DETAILED DESCRIPTION OF PREFERRED EMBODIMENTS

Figure 1:
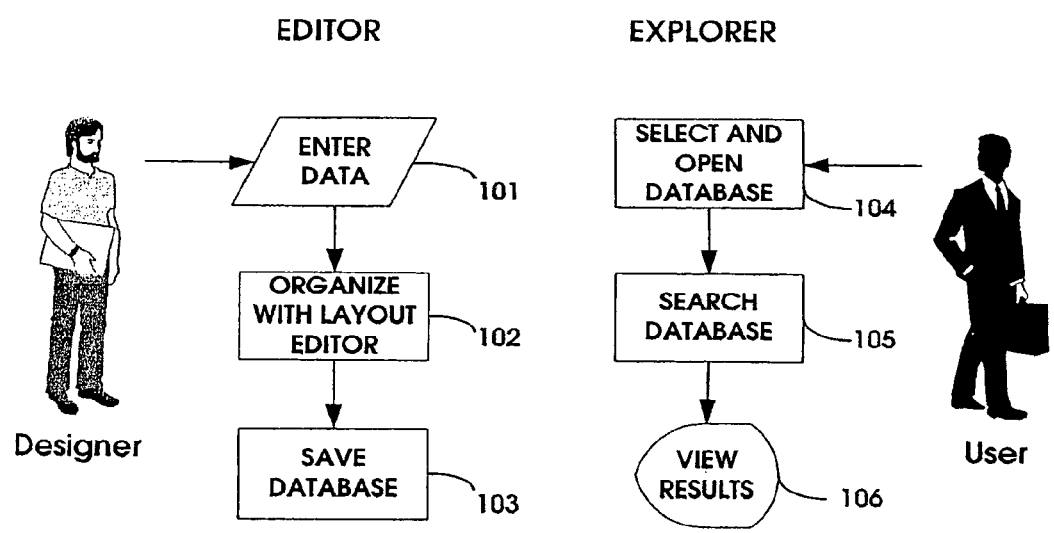
FIG. 1 is a diagram representing the relationship between components of the software system of the present invention.

A preferred embodiment of the invention is a field guide to natural objects that can serve as a true replacement for the highly popular printed field guides currently used by amateur naturalists to learn about and identify species or types of natural objects such as birds, insects, flowers, trees, rocks and the like. The description that follows will use a field guide to birds as an example of this preferred embodiment, and a standard desktop personal computer running Microsoft Windows as an example of a computing platform on which the preferred embodiment runs. The term "portable computer device" as used herein includes PDA's, pocket PC's, mobile phones with display ("SmartPhone"), Palm devices, laptops or even a desktop computer mounted so as to be mobile.

An important aspect of the present invention and of its preferred embodiment is a method used to maximize positive results in the search process and to eliminate the frustration of engines that yield useless results. This method, referred to generally as a Smart Search, has three component features.

The first component of smart search is a step-by-step approach to filtering, which is used to reduce the chances of obtaining zero matches. Almost all search programs and engines require that all the characteristics a user is interested in be chosen before the search commences. For example, if the database being searched were a field guide to birds, the user would first select all the characteristics of the bird that was observed, such as color, apparent length, wing span, patterns, bill shape, and so on, and then initiate a search. With this "all-at-once" approach it is possible for the user to enter a combination of choices that results in no items being found. It will not be clear what particular choice caused the search to fail to find any valid items, which is one major frustration to users of search engines.

The approach of the present invention totally eliminates the possibility of finding no valid matches by allowing the user to select one and only one characteristic at a time, so that the process of searching is a refinement process, and each choice narrows the matched set.

The second component of smart search involves eliminating redundant or irrelevant attributes, or Smart Attribute Elimination. Returning to the example of a field guide to birds, consider that the user is presented with the attribute for Eye Color and selects "yellow." Now imagine that all birds with yellow eyes have hooked bills. If the next attribute presented to the user is Bill Shape it is possible that the user will select a bill shape that yellowed eye birds do not have, and the result will be zero matches.

The current invention avoids this problem by using what we refer to as Smart Attribute Elimination: when the user makes a choice from a list of attributes, and selects a value (or values), the software guarantees that in future search stages the only attributes presented are those that will help further narrow the search. Irrelevant attributes are not presented as choices. In our bird example above, if the user selected yellow eyes and all yellow-eyed birds had hooked bills, the bill shape attribute would no longer be presented to the user. Since all yellowed-eyed birds have the same kind of bill, searching on bill type would not narrow the matches any further.

The third component of smart search involves eliminating redundant or irrelevant values, or Smart Value Elimination. In a typical search engine, when an attribute is to be searched, the user must select from several values for that attribute. For example, in a field guide to birds, the attribute wingspan would involve a list of all the wingspan lengths for all birds in the database. In a traditional search, if this is the first attribute the user chooses, this will always give at least one match. However, if this is not the first attribute searched, and all wingspan values are again presented, it is highly possible that the user will select a wingspan that does not exist in the remaining set of matched birds, resulting in zero matches.

The present invention circumvents this possibility by eliminating all values for an attribute that are not present among the remaining matches. For example, in a field guide to birds, assume that the user has narrowed the search to all birds with yellow eyes and has selected bird weight as the next attribute. The software examines the set of matched objects and only presents as possible values those weights that are valid for birds with yellow eyes. Weights for birds without yellow eyes, if they are out of this range, are not presented because they could cause the search to give zero matches. This is called Smart Value Elimination.

Smart Attribute Elimination, combined with Smart Value Elimination, and implemented in a step-wise selection process, guarantees that the user will always find at least one valid match. This combined set of features is called SAVE (Smart Attribute and Value Elimination) and is the specific method for the Smart Search that is implemented in the present invention.

Referring to FIGS. 1 through 5, the system is divided into two main components: an Editor program for creating databases, with a Layout Editor program that is a module of the Editor, and an Explorer program for searching the database created by the Editor.

Creation of a database in this system begins with a design phase. The person responsible for implementing the searchable database (the Designer) first considers the design and conceptual layout of a database to be searched. The Designer starts by choosing the subject matter to be organized into the database format. The subject matter must have the following characteristics:

a. the subject matter needs to be of a type that can fit into a collection of items (also called objects), such that each item in the collection shares a set of common characteristics (also referred to as attributes) with other items in the collection;
 b. there must be a minimum of two items or objects in the collection that will be used for the database;
 c. the maximum number of items in the collection is limited only by the particular software and hardware system used to implement the system. For the popular Windows operating system, which is utilized in the preferred embodiment of the present invention, the limits are approximately 32,000 objects, attributes and values;

d. the characteristics of the items that make up the collection must be describable in conformance with one of the following data types:
   i. textual
   ii. single-number
   iii. numeric range
   iv. audio (sound)
   V. graphical image
   vi. image map
   vii. Hypertext Markup Language (HTML)
   viii. Links: internet or local web, email, ftp, etc.
   ix. Web service
   x. animation
   xi. video e. Each characteristic of the items that comprise the collection must have a distinct description (also called a value) using any of the data types described in d, above. For example, a value for the characteristic "eye color" could consist of a text description of different colors for eyes; a value for the characteristic "weight" could consist of a number; a value for the characteristic of "wing shape" could be described by the image of a wing; a value for the characteristic of "bird call" or "voice" could be described by a sound; the value for a flight pattern of a bird could be an animation, etc.

f. The designer of the database organizes a collection into a set of objects, attributes and values. Each database contains a set of objects that possess some common attributes (e.g., wings, of various spans; weight; size; color; eye color; beak shape; geographic location where found). Each attribute in the database may be described by one or more values pertaining to that attribute. Therefore a database is composed of objects with common attributes, with those attributes being identified or described by different values.

1. Relation between Components. Once the Designer has chosen the collection for which a database will be created, there are four main tasks to perform. Refer to FIG. 1, which shows the relation between components.
   a. (101) Editor Component The designer begins by entering data into the database Editor consisting of: the objects that will be searched; attributes that represent the key characteristics of the objects; and values that represent specific instances of the characteristics.
   b. (102) The designer uses a layout editor to organize the attributes in a hierarchical order and to set up "groups" that will hold similar attributes.
   c. (103) The designer saves the database on the respective computer platform.
   d. (104) Explorer Component. Once the database has been created, the user starts by selecting the database and opening it in the Explorer (or viewer) program.
   e. (105) The user searches the database, preferably by selecting attribute icons and selecting among the values entered by the database designer.
   f. (106) The result of a search is one or more matched objects. The user selects those objects that he wishes to view more information about.

Figure 2:
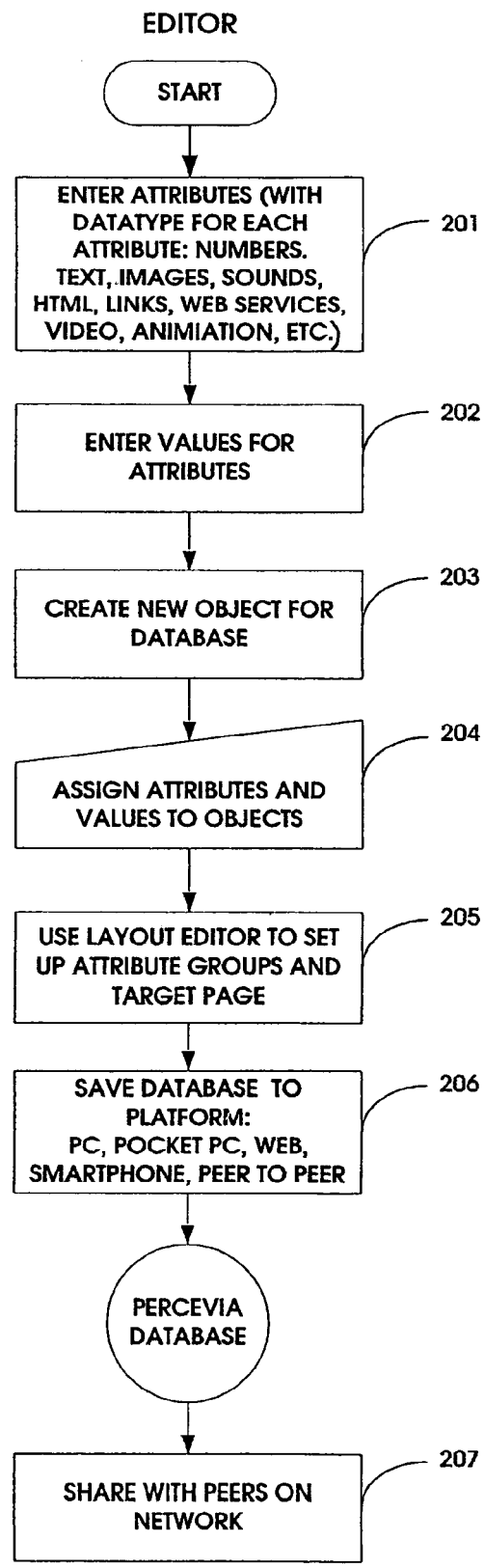
FIG. 2 is a flow chart depicting the use of the Database Editor, which is used to design and create collections of objects.
Figure 3:
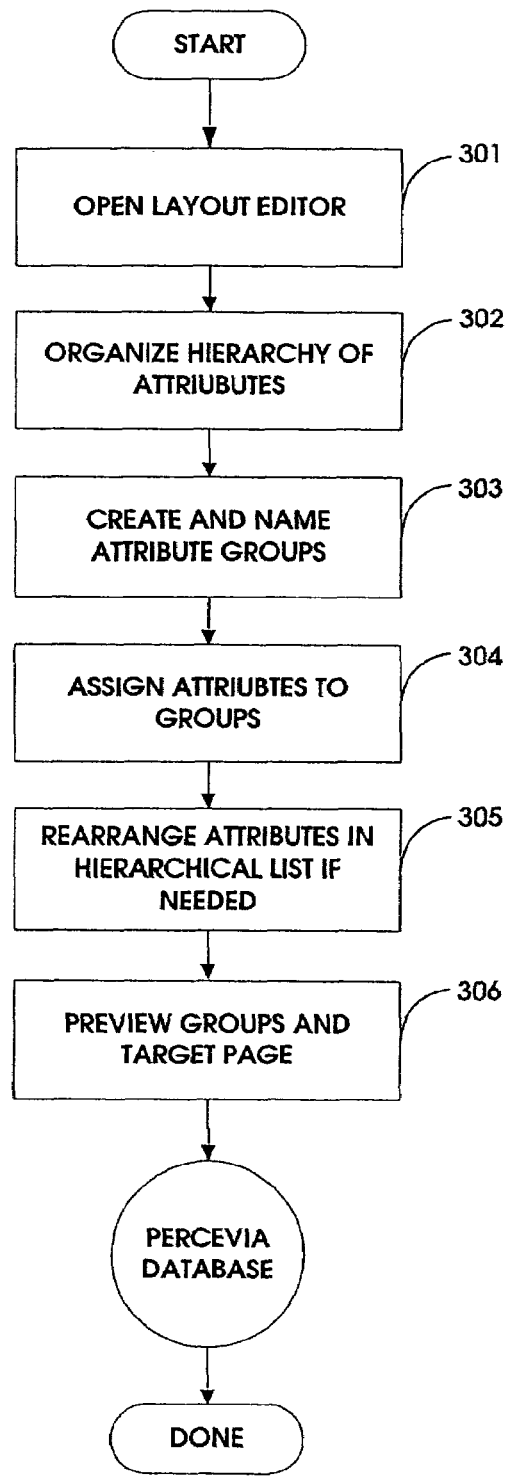
FIG. 3 is a flow chart depicting the use of the Layout Editor, which is a module of the Database Editor and is employed to establish the screen layout of pages presenting information about objects within the database.

2. Database Editor. The desktop Editor is used to create and organize the data in the database. Refer to FIG. 2, database editor flow chart and to FIG. 2A, editor interface.
   a. (201) Assemble and enter the list of searchable attributes that the objects in the database have in common, and that can be useful for identification of the objects. Attributes should be describable in terms of short, succinct values that can be differentiated quickly, such as a list of colors, numbers, or simple images. For example, in a field guide to birds, the searchable characteristics might be eye color, length, wingspan, color, pattern, bill shape, wing shape, etc. Values for a particular attribute may be numeric, textual, audio, animation, HTML, etc.
   b. (201) Assemble and enter a list of non-searchable attributes that the objects have in common. For example, a field guide to birds would contain field information such as breeding and nesting, foraging and feeding, range and habitat, vocalization, and so on. An example of an attribute that should be considered non-searchable is one that is comprised of unique paragraphs of text rather than just a few words. In such cases, the user of the database will not be able to easily distinguish differences in the attribute without reading all the text, which would be time-consuming. The reason for entry of these attribute descriptions is for review by the searcher for a particular object.
   c. (202) Assemble and enter the values for each attribute associated with each object in the collection. For example, in a field guide to birds the value for the length characteristic for the Barn Owl would be 17 inches; for the Osprey it would be 22.5 inches; the bill shape image for the Barn Owl would be a hooked graphic; for the Robin it would be a cone-shaped graphic, etc. Color patches can be used for selecting color of a designated part of the bird.
   d. (203) Create and enter objects into the database and assign a name and icon for each object. Each object's icon will be displayed in a Match Window that is part of the Explorer program, and the name assigned to the object will appear under the icon. The icon is used to help the user understand what the object represents. For example, if the database is a field guide to birds, the objects will be birds and so the icon would be a picture of the bird, and the name will represent a particular bird.
   e. (204) Assign attributes and values to the objects in the database. The editor user selects an object, such as a certain type of Owl, and then selects an attribute, such as eye color. Next the eye color for the particular owl is selected from the list of available values for bird eye colors; in this case it might be a text value of "yellow" (or a color patch of yellow could be displayed). With the eye color attribute still selected, the user selects the next object, for example "Robin," and chooses the eye color for it, which might be "black." This process is repeated until every object has been assigned a value for the eye color attribute. Then the user proceeds with the next attribute, which might be bill shape, and assigns a value for every object. Note that not all attributes must be assigned to all objects. For example, not all birds have ear tufts (this is mostly an attribute of owls), so in this case those birds lacking ear tufts would not receive an assignment.
   f. (205) Use the Layout Editor to organize the attributes in a hierarchical list. This is the order on which the attribute icons will be presented to the user of the Explorer program. The Layout Editor is described in more detail in section 3, below.

g. (206) Save the database to the respective platform. The database can be named to help the person viewing it, such as "Field Guide to Birds of California." The platform is a computer device, such as a personal computer, laptop, pocket pc, palm device, SmartPhone or Web database.

h. (207) If the computer holding the database is attached to the internet or to a cellular network, the database can be made available to other users of the program via a peer-to-peer sharing system.

3. Layout Editor. The layout editor is a module of the Database Editor that is used to organize the way the attributes will be presented to the person viewing the database with the Explorer viewing program. Refer to FIG, 3, showing a layout editor flow chart" and FIG. 3A, showing the layout editor interface." Use of the Layout Editor involves the following steps:

a. (301) initiate the Layout Editor by selecting its name from a menu in the Database Editor.
   b. (302) Organize the hierarchy of attributes for how they will appear in the Explorer program. Usually attributes are organized so the most popular attributes are presented at the top of the Explorer window and the less popular attributes at the bottom.
   c. (303) Create a set of groups to hold common attribute icons. Groups are text menus that appear in the Explorer attribute window, which help organize the attributes for the user to choose. For example in the case of birds, a group might be named "Head Details," and attributes assigned to it would be eye color, crown color, bill shape, and so on. Group menus also appear on the "Target Page" of the Explorer. This is the page that is displayed when the user selects an object icon in the Explorer. It contains all the information about the object in a reader-friendly format.
   d. (304) Assign the attributes that have been organized in step 302 to the groups that have been created in step 303. The same attribute can be assigned to multiple groups.
   e. (305) Rearrange attributes and groups as needed.
   f. (306) Preview the groups and attributes and save the database if satisfied.

Figure 4:
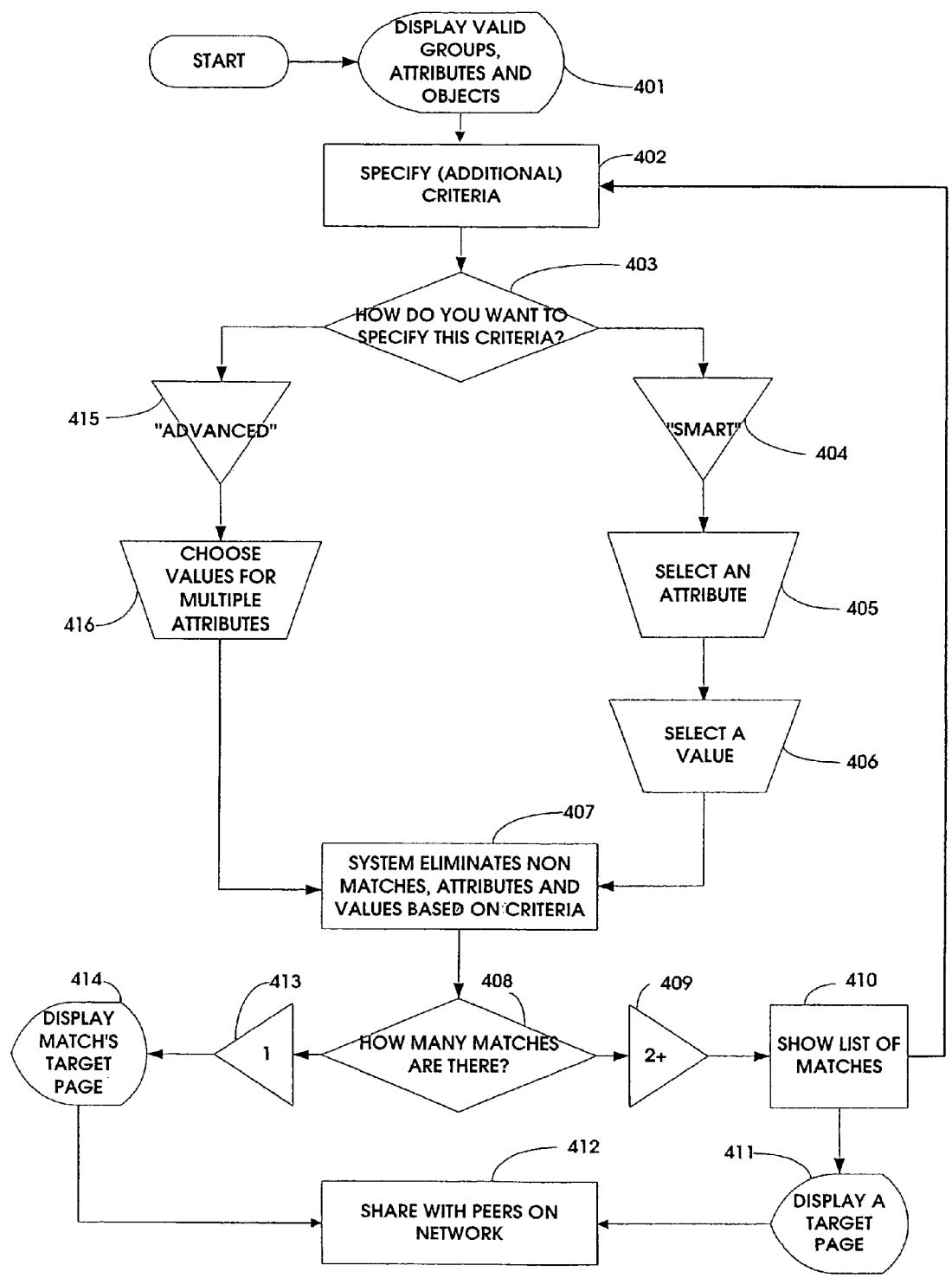
FIG. 4 is a flow chart of the object search process performed by the Explorer with inputs from a user.

4. Explorer (Viewer) Hybrid Search System. The Explorer program is used for searching the database and is an important aspect of this invention. There are two search systems in the Explorer: a Smart Search and an Advanced Search. Both search systems can be used together, which make this a hybrid system. Refer to FIG. 4, showing a hybrid search explorer flow chart and FIGS. 4A through 4E, explorer interface. Using the Explorer search system involves the following steps:

a. (401) The program displays valid groups, attributes and objects. First it scans the list of groups, attributes and objects to insure that they are valid, then displays the attributes in the attribute window and the objects in the Match Window. The display preferably consists of four windows: a Match Window, an Attribute Window, a Quick Search Window, and a History Window. See FIG. 4A, showing the explorer interface (illustrating a search for computers).
   b. (402) The user specifies additional criteria. By expanding the list of matches using the Show All feature, the user may find the object he is seeking. If not he can proceed with the search function.
   c. (403) A notable feature of this invention is the ability to mix two different search approaches: Advanced and Smart. The Advanced Search is a conventional search where the values are selected for multiple attributes in one step. The user submits the search to the engine and the results appear in the Match Window. Using this type of search it is possible the user may chose a combination of attribute value pairs that result in no match. In the case of the Smart Search the user specifies one attribute and multiple values at a time, then submits them to the search engine. This step, as will be seen below, allows the software to perform checks that prevent attribute value pairs from being presented to the user that would result in zero matches. This is called Smart Attribute and Value elimination by the inventors.
   d. (404) Smart searching is selected.
   e. (405) The user selects a single attribute from the list that is presented in the Attribute Window.
   f. (406) After the user presses a Continue button, a list of values for the attribute is presented. Only values that are valid for the objects remaining in the match windoware presented. A value is selected.
   g. (407) After the user presses a Continue button, the search engine eliminates all objects that do not match the criteria. The count of valid objects is displayed as X of Y where X is the remaining number of objects and Y is the original, total number of objects. Attributes and values that would not help narrow the search are eliminated.
   h. (408) How many matches are there? If there are two or more valid matches in the database, the program branches to 409. If there is only one valid match in the database the program branches to 413.
   i. (409) If there are two or more valid matches in the database, the search may be narrowed further.
   j. (410) The list of valid objects is displayed in the Match Window.
   k. (411) The user can click on any object icon in the Match Window and display the Target (summary) Page, which gives detailed information about the objects. The program then continues to step 402 where more criteria (attributes and values) can be specified.
   l. If there are no more attributes and values that would narrow the search, the user is presented with a message and the remaining matched objects are left in the match window. This is a key feature of this invention: the user will never be faced with a null result as long as they use the Smart Search feature.
   m. (412) If there are other users running the program, the information presented in the match window can be shared with those users on the internet or a cellular network using a peer-to-peer network mechanism.
   n. (413) If there was only one object remaining object at step 408, the program continues to 414.
   o. (414) The Target (summary) Page for the one remaining object is displayed. The search is over.
   p. (415) Instead of selecting the smart searching using a step-by-step approach, the user can select the Advanced Search mode.
   q. (416) In the Advanced Search mode the user chooses as many attributes and values as he wishes, rather than one attribute at a time. Once multiple attributes and values have been selected, a Continue button is pressed and the search is executed. An important distinction between the Advanced Search mode and the Smart Search mode is that it is possible the Advanced Search will yield no matches.
r. One of the key aspects of this invention is that the Advanced and Smart search functions can be used in tandem, that is, simultaneously. A user can perform a series of Smart Searches, one attribute at a time, and then perform an Advanced Search, selecting several attributes before continuing. An efficient search approach using the hybrid method would be to use the Advanced mode, selecting a broad set of attributes that the user is certain about, then use the step-by-step mode to narrow down the search.

Figure 5:
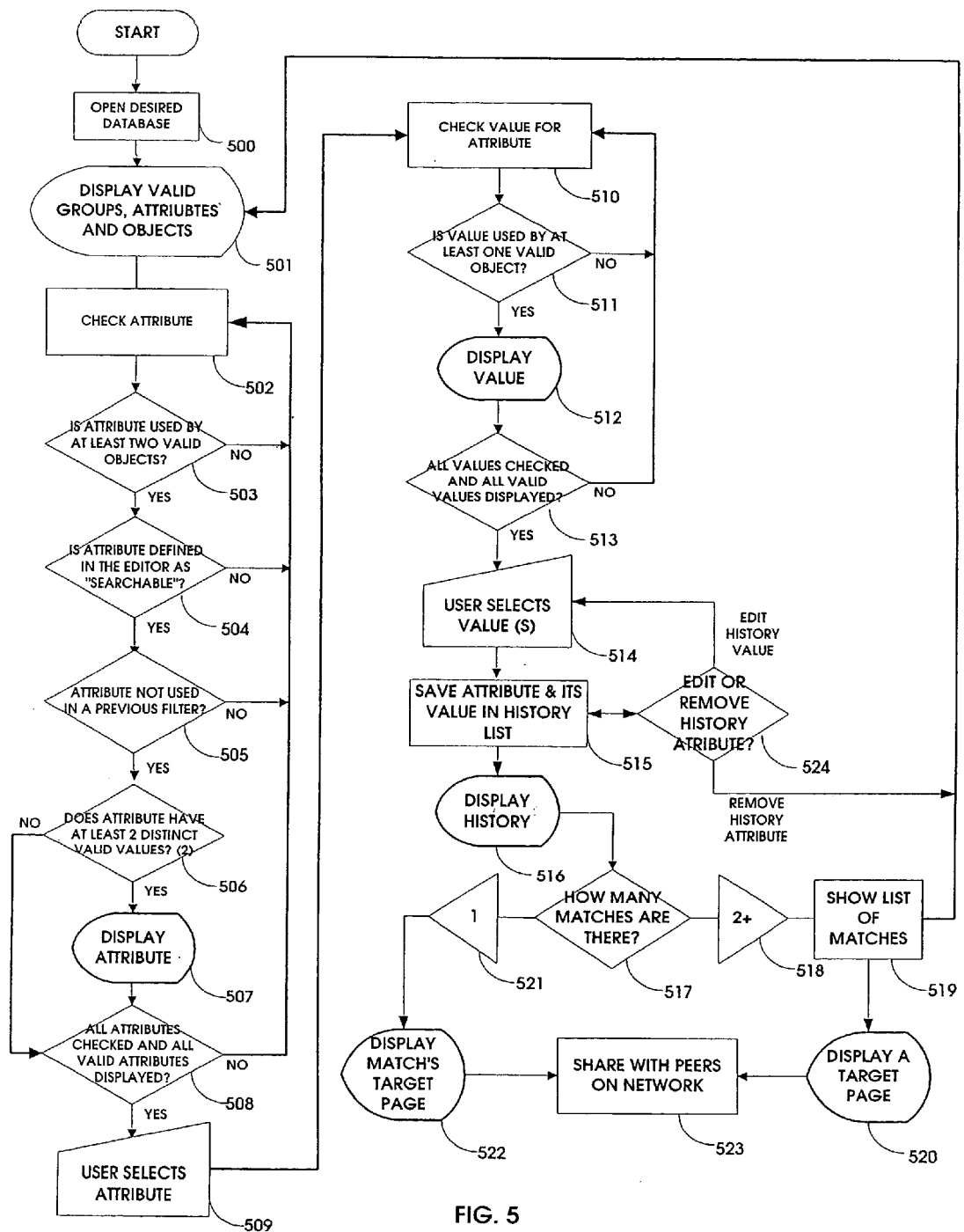
FIG. 5 is a flow chart of the Smart Attribute and Value Elimination algorithm as utilized in the preferred embodiment of an electronic field guide to birds.

5. Smart Attribute and Value Elimination. A key aspect of this invention is Smart Attribute and Value Elimination. This refers to the ability of the software to ease the burden on the user by making sure there are no attributes presented that will not help narrow the search. In this section the Explorer's smart SAVE feature is explained. Refer to FIG. 5, detailed flowchart of smart attribute and value elimination.

a. (500) The user enters an input to select a desired database.
   b. (501) The process begins with a general validity check of the groups, attributes and objects to make sure they are qualified. The objects are displayed in the match window.
   c. (502) The Smart Attribute Elimination process next checks each attribute one at a time to make sure only ones that will help narrow the search are displayed. The first attribute is checked. This routine is located here because of the large reiterative loop shown in the drawing, although not all steps shown here would be needed or operable prior to the user's first selection of an attribute.
   d. (503) Is this attribute used by at least two valid objects? If an attribute is not used by at least two valid objects it will not be displayed since it generally will not narrow any search. In that case, this attribute will be skipped and the loop branches to 502 where the next attribute is checked.
   e. (504) Check if the attribute is defined as "searchable." If it is non-searchable it should not be displayed in the attribute list, and this attribute will be skipped. In that case the loop branches to 502 where the next attribute is checked.
   f. (505) Is the attribute not used in a previous search step? If it has been used, this attribute need not be displayed and the loop branches to 502 where the next attribute is searched.
   g. (506) Does this attribute have at least two distinct valid values? Often if an attribute lacks at least two valid values (e.g., it only has one valid value) that single value will not help narrow the search any further because it can't be compared to anything. For simplicity, if there are not at least two values the attribute will not be displayed and the loop branches to 508 to check if all valid attributes have been displayed.
   h. (507) Once all the above checks have been made (503 to 506) the attribute has been qualified as a valid attribute and it is displayed.
   i. (508) Have all attributes been checked for validity? If all have been checked, the program is ready for the user to make a selection. If not, the program loops back to 502 where the next attribute is checked.
   j. (509) With all valid attributes displayed, the user selects an attribute and the program branches to step 510.
   k. (510) After the user selects an attribute the program uses Smart Value Elimination to decide what values to display for the selected attribute. Every attribute has a list of possible values, which can be text, number, image, HTML, audio, etc. These must be checked for validity before being displayed.
   l. (511) Is the first value used by at least one valid object? If the value is not used by any object it will not help narrow the search so it is not displayed, and the program branches back to step 510 to check the next value for the attribute that was chosen.
   m. (512) Display value. The value can now be displayed.
   n. (513) Have all values been checked for validity? If not, the program branches back to 510 and the next value is checked. If this is the last value the program is ready for the user to make a selection.
   o. (514) Select a value or a set of values from the displayed list of values.
   p. (515) Save the attribute and the value that has been selected in the History Window.
   q. (516) Display the saved attribute and its value in the History Window. The History Window allows the user to keep track of his progress and choices as well as allowing the user to change any prior choices (step 524).
   r. (517) How many matches are there? The program now calculates the result of the users attribute value selection.
   s. (518) If there are two or more valid matches the program proceeds to step 519.
   t. (519) Because there are two or more valid objects remaining, the program displays the matched object icons in the match window. Here the user can select an icon for further information. Once the object icons have been displayed the program branches to 501, where the remaining attributes are displayed so further searching can proceed.
   u. (520) Display a Target (summary) Page. If the user clicks on any of the object icons in the Match Window then return to either 501 or 521. If there is only one valid match the program automatically displays the target page for that object, and no object icons appear. The searching ends.
   v. (523) If there are other users running the program, the information presented in the match window can be shared with those users on the internet or a cellular network using a peer-to-peer network mechanism.
   w. (524) At any time the user can select an attribute name in the History Window. He can chose to Edit the attributes values or Remove the attribute from the list of selected attributes. When the attribute is removed the program branches to step 501 where a new test for valid attributes is performed.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the follow claims.

What is claimed is:

1. A field-useable guide in the form of a portable computer device for identifying natural items observed by a user from a collection of natural items, comprising:
   a housing for the portable computer device, the housing containing a programmed microprocessor, data storage, a display screen and a user input,
   means in the microprocessor and data storage for displaying to the user a series of selectable attributes which vary among natural items in the collection of natural items, each attribute having one or more data types in which a plurality of values for the attribute are stored in the data storage,
   the values for the series of selectable attributes being in a plurality of the following data types stored in the storage for presentation to the user in a search conducted by the user:
   (a) descriptive text,
   (b) number values,
   (c) color images of natural items in the collection of natural items,
   (d) sounds produced by natural items, in the case of a group of animals as the collection of natural items,
   (e) moving pictures of natural items, in the case of animals as the natural items of the collection,
   (f) color samples for matching to a feature of an observed natural item of a collection of natural items,
   (g) silhouettes representative of groups of natural items within a collection of natural items, and
   search means associated with the microprocessor for enabling and prompting the user, on the display screen, to perform a step-by-step elimination search to identify a natural item observed in the field by selecting one of said attributes, reviewing the various values presented by the portable computer device as possible values under the subject selected attribute for the natural item observed in the field, then selecting one said value for the selected attribute, then selecting another of said attributes, reviewing the values presented as possible values for said another selected attribute and selecting one of the values, and continuing the stepwise elimination search to further reduce the number of possible natural items in the natural items of the collection, the search means progressively eliminating non-matches from a list of possible natural items in the natural items of the collection,
   and including elimination means associated with the microprocessor for eliminating further said attributes which become irrelevant or redundant after selection by a user of a particular value for a said attribute, and further including means associated with the microprocessor for eliminating certain of the values under particular said attributes which values become irrelevant or redundant as choices due to prior selection of particular aid values under one or more previously selected said attributes,
   whereby the elimination means, in the step-by-step elimination search, assures against a null result of the search.

2. The field-usable guide of claim 1, wherein the portable computer device is internet enabled, and at least some of the values for at least some of the attributes including web links to further information or images, as a data type in which such values are stored.

3. The field-useable guide of claim 1, wherein the portable computer device is a PDA.

4. The field-useable guide of claim 1, wherein the portable computer device is a laptop computer.

5. The field-useable guide of claim 1, wherein the portable computer device is a mobile phone with display.

6. The field-useable guide of claim 1, wherein the collection of natural items comprises a class of living things, and wherein the attributes include geographic location where observed.

7. The field-useable guide of claim 6, wherein the class of living things comprises birds, and wherein the attributes include silhouette, wingspan, color of a designated part of the bird, and eye color.

8. The field-useable guide of claim 6, wherein the class of living things comprises birds, and wherein the attributes include wingspan, body size and color of a designated part of the bird.

9. The field-useable guide of claim 8, wherein the attributes include voice, with the data types including sounds produced by the natural items.

10. The field-useable guide of claim 8, wherein the attributes include tail shape.

11. The field-useable guide of claim 8, wherein the attributes include wing type, as represented by images for values.

12. The field-useable guide of claim 8, wherein the attributes include eye color.

13. The field-useable guide of claim 8, wherein the attributes include patterns on various birds.

14. The field-useable guide of claim 1, wherein the search means includes means for enabling the user to select an order in which attributes are selected.

15. The field-useable guide of claim 1, wherein the means for displaying displays selectable said attributes in a predetermined order, but wherein the search means includes means for enabling the user to select a desired order in which the attributes are selected.

16. The field-useable guide of claim 1, wherein the means for displaying includes means for displaying visual icons representing groups of natural items among the collection of natural items.

17. The field-useable guide of claim 16, wherein the visual icons comprise silhouettes.

18. The field-useable guide of claim 1, wherein the search means and the means for displaying include a selectable show all feature with means for displaying to the user all natural items of the collection not eliminated, at a desired point in the user's search.

19. The field-useable guide of claim 1, wherein the search means and means for displaying include means for indicating the number of natural items remaining in the list of natural items of the collection, after the user's selection of one or more of said attributes and values under the selected attributes.

20. The field-useable guide of claim 1, wherein the user input comprises a touch screen for making selections.

21. The field-useable guide of claim 1, further including advanced search means associated with the microprocessor for enabling the user to perform a search wherein a plurality of the attributes are selected in a single step, and one of said values selected under each selected attribute within such single step.

22. A method carried out by a field guide in the form of a portable computer device having a programmed microprocessor, data storage, a display screen and a user input, for facilitating a search to identify natural items observed by a user, from a collection of natural items, information about which is stored in the data storage with characteristics or attributes for the items comprising:

displaying to the user a series of selectable attributes which vary among items in the collection of natural items, each attribute having one or more data types in which a plurality of values for such attributes are stored in the data storage, the values for the various attributes being in a plurality of the following data types stored in the database for presentation to the user during a search initiated by the user:

(a) descriptive text,
        (b) number values,
        (c) numerical ranges,
        (d) color images of items in the collection of items,
        (e) sounds produced by items, in the case of a group of animals as the collection of items,
        (f) moving pictures of items, in the case of animals as the items of the collection,
        (g) color samples for matching to an observed item of a collection of items,
        (h) silhouettes representative of groups of items within a collection of items, receiving an input from the user of a particular selected first attribute from the series of attributes, displaying to the user all possible values under the selected attribute, in at least one of the data types (a) to (h), for the collection of natural items, receiving the user's input selecting a value from among the series of possible values, reviewing the items in the data storage following the user's selection of a value, and eliminating items precluded by such user selection and maintaining a list of remaining items, and eliminating further attributes which become irrelevant or redundant by the user's selection of a particular value for the first attribute, and also eliminating certain values under particular attributes, which values become irrelevant or redundant as choices due to prior selection of the particular value under the first attribute, as the search progresses, continuing to review the remaining items in the data storage and continuing to narrow the number of choices for attributes that can be selected by elimination of those attributes that are no longer useful in narrowing the search because of values selected by the user, and continuing to narrow the number of values in remaining attributes as the search progresses by elimination of those values that are no longer useful in narrowing the search, thereby preventing a null result for the search, and displaying to the user a result in the form of an identified natural item from the collection of natural items.

23. The method of claim 22, further including, as the search progresses, displaying to the user a number of items remaining in the collection after the user has selected a value for an attribute.

24. The method of claim 22, further including, upon selection by the user, displaying all possibilities remaining in the collection of natural items after a user has selected a value for an attribute during the course of the search.

25. The method of claim 22, wherein the data type in which the values for the attributes are stored include at least text, number of values and images.

26. The method of claim 25, wherein the data types further include sounds produced by the items, in the case of a group of animals as the collection of items.

27. The method of claim 25, wherein the data types further include moving pictures of an item in the case of animals as the item of the collection.

28. The method of claim 25, wherein the data types further include color samples for matching to a feature of an observed item in a collection of items.

29. The method of claim 25, wherein the data types further include a map image, for location as an attribute.

30. The method of claim 25, wherein the data types further include internet web links.

31. The method of claim 25, wherein the data types further include hypertext markup language (HTML).

32. The method of claim 22, further including enabling the user to select an advanced search mode and allowing the user to select a plurality of attributes and values for those attributes simultaneously rather than in stepwise fashion.

33. The method of claim 22, including permitting the user to enter more than one value for an attribute.

* * * * *